Figure 1:
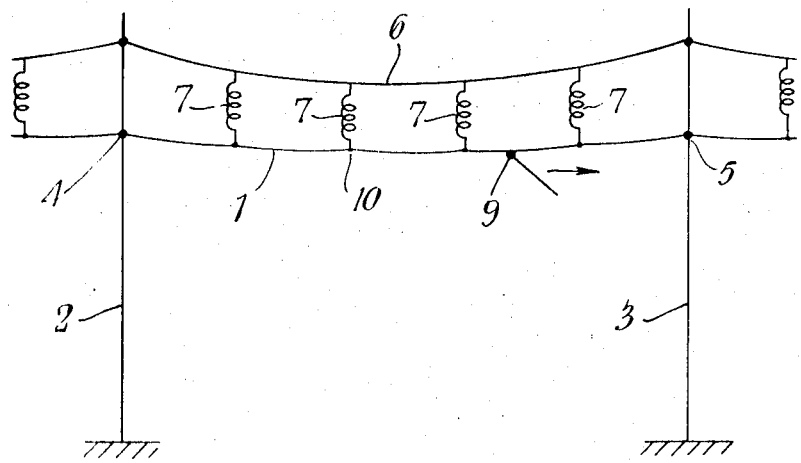

United States Patent
Tustin et al.

[15] 3,644,688
[45] Feb. 22, 1972

[54] OVERHEAD ELECTRIC SUPPLY SYSTEMS FOR VEHICLES

[72] Inventors: Arnold Tustin, Tring; Richard Geoffrey Sell, Rugby, both of England

[73] Assignee: British Railways Board, London, England

[22] Filed: Jan. 12, 1970

[21] Appl. No.: 2,164

[30] Foreign Application Priority Data

Jan. 15, 1969 Great Britain..........................2,414/69

[52] U.S. Cl..............................................191/40, 267/155
[51] Int. Cl............................................................B60m 1/234
[58] Field of Search..............................191/41, 40; 335/209

[56] References Cited

UNITED STATES PATENTS

| | | | |
|---|---|---|---|
| 966,102 | 8/1910 | Kempton | 191/41 |
| 1,150,067 | 8/1915 | Schaake | 191/41 |
| 1,592,369 | 7/1926 | Jorstad | 191/41 |
| 3,128,858 | 4/1964 | Kumezawa | 191/41 |
| 3,452,309 | 6/1969 | Wilkes | 335/209 |

FOREIGN PATENTS OR APPLICATIONS

| | | | |
|---|---|---|---|
| 982,190 | 2/1965 | Great Britain | 191/41 |
| 1,064,550 | 9/1959 | Germany | 191/41 |

*Primary Examiner*—Arthur L. La Point
*Assistant Examiner*—George H. Libman
*Attorney*—Sommers & Young

[57] ABSTRACT

A trolley wire overhead electric supply system, for supplying power for the propulsion of electric vehicles, comprises a contact wire which is directly supported by each supporting mast. At points remote from the masts the contact wire is additionally supported by soft elastic support members to provide a lifting force on the contact wire partially compensating for the weight of the contact wire.

10 Claims, 8 Drawing Figures

Arnold Tustin
Richard Geoffrey Sell
Inventors by Sommers & Young
Attorneys

OVERHEAD ELECTRIC SUPPLY SYSTEMS FOR VEHICLES

This invention relates to overhead electric supply systems in which electric current is drawn from an overhead contact wire to provide power for the propulsion of vehicles and particularly of rail vehicles.

It has hitherto been considered necessary where relatively high speeds are required, to provide an overhead system of the kind commonly referred to as a catenary system, in which the contact wire is supported at intervals by "droppers" from an auxiliary wire or "catenary". The purpose of this form of construction is to hold the contact wire approximately straight and parallel to the rails, or with a controlled amount of sag, so that the contact member on the vehicle (referred to as the 'pantograph' can maintain contact without being required to make large vertical movements, especially large vertical accelerations.

A simpler and less expensive system employs a single wire supported and located at the masts so that the contact wire itself droops into a catenary. This system is hereinafter referred to as a 'trolley-wire system.'

In the specification of our copending U.S. application Ser. No. 875,167 filed Nov. 10, 1969 the basic principles of the trolley wire system are discussed in detail and a mathematical consideration of the required properties of the trolley wire system, to avoid large vertical accelerations of the pantograph head and thus make it suitable for high-speed operation, is given. One such necessary property of the trolley wire system appearing from this mathematical consideration is that the weight of the contact wire which has to be lifted by the pantograph head so that the latter maintains a substantially constant height above the track is sufficiently small to have a desired relationship with the upward force exerted by the pantograph. However this property is in conflict to some extent with other operating requirements, namely the current-carrying capacity under emergency loading conditions when the wire is fully worn, and the allowable amount of wear of the wire.

The object of this invention is to provide a trolley wire system in which a relatively heavy contact wire may be used without affecting its satisfactory operation.

According to this invention a trolley wire system has, in addition to its support and location at the masts, soft elastic support members providing upward forces on the contact wire to partially compensate for the weight of the wire. The term "-soft" elastic support member is used herein to designate an elastic support member whose rate or stiffness does not vary significantly with displacement. In other words, the change in upward force applied to the contact wire by the elastic support member does not decrease significantly as the contact wire is lifted.

Said elastic support members may be suspended from an auxiliary wire slung between the masts, or, alternatively, they may be embodied in a so-called "stitch suspension" for the contact wire.

The aforesaid support and location of the contact wire at the masts may be through a two rate spring arrangement, which for upward pantograph forces on the wire below a certain value provides a relatively stiff restraint to said forces, and for upward forces on the pantograph wire above said value provide a relatively soft restraint or have a negative rate i.e., they assist in lifting the contact wire.

For satisfactory operation, rapid changes of vertical velocity of the pantograph head, corresponding with the changes in slope of the trajectory of the contact point, particularly in the neighborhood of the masts, must be avoided and such changes are small if the total force applied by the said elastic members is approximately $W-2P$ where $W$ is the weight of the contact wire per span and $P$ the upward force of the pantograph on the wire.

This may be shown as follows:

Let $S$ be the total of the elastic forces on each span (irrespective of their distribution within each span so long as it is the same for successive spans). Then the reaction at each mast in the absence of the pantograph, is $W-S$. This reaction must be balanced by the vertical components of the tension $T$ in the contact wire, so that the change of slope at the masts is $-W-S/T$ For the force $P$ due to the pantograph passing over the span, the deflection due to it alone (i.e., calculated as if $W$ and $S$ were zero) is added to the deflection due to $W$ and $S$. When $P$ is at a distance $x$ beyond a mast, in a span of length $L$, the consequent deflection upwards is of triangular profile. The reaction at the mast is $P \cdot L-x/L$ and the slope of the wire at the support is $P/T \, L-x/L$. If $y_p$ is the deflection at the pantograph this slope $y_p/x$ and $$y_p/x = P/T\,(L-x)/L$$

so $$y_p = P/T \cdot x \cdot (L-x)/L$$

Thus the contribution of the pantograph force to the contact-point trajectory is given by a parabolic arc upwards.

The slopes $d\,y_p/dx$ of this contribution are

At $$x = 0,\ d\,y_p/dx = P/T$$

At $$x = L\ d\,y_p/dx = -P/T$$

and the change of slope at each support is $2\,P/T$.

The net change of slope of the trajectory due to $W$, $S$ and $P$ together, by addition is $-W-S/T + 2\,P/T$, and this is zero if $W-S=P$.

This is the condition that the contact-point-trajectory is a straight line through the support point for sufficiently small vehicle speeds.

At higher speeds, as may be shown by more detailed calculations, the deflection due to the pantograph force $P$ tends to be slightly less because of the effect of the inertia of the wire. The desired result of little change of slope of the trajectory at the supports may however still be attained, especially if, by means that are well known, the pantograph is so arranged that some increase in contact force results from increasing speed due to aerodynamic forces.

In carrying out the invention the elastic members that provide the upward force $S'$ on the contact wire, are preferably of small stiffness or spring-rate, that is the upward lifting force varies little with the vertical displacements of the contact wire that occur as a pantograph passes. Since, however, the attachment of the elastic members to the contact wire will cause minor cusps to be formed it may be advantageous for the elastic members to have a predetermined small stiffness or rate to minimize the effect of these cusps on the trajectory of the pantograph head, in that the stiffness in the elastic members will cause a flattening of the cusps as the pantograph head passes.

Figure 2:
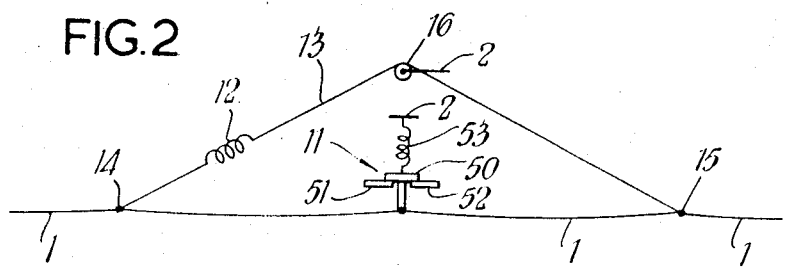
Figure 3:
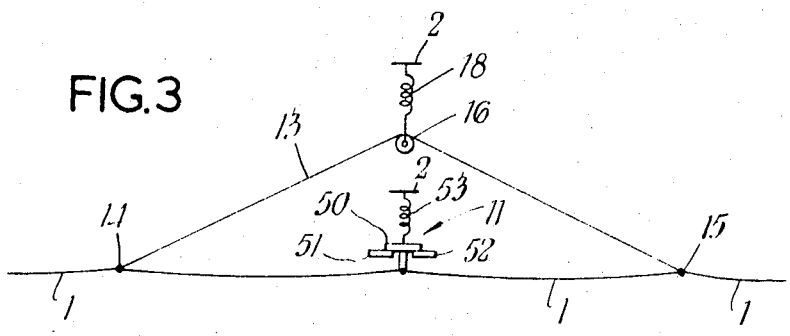
Figure 4:
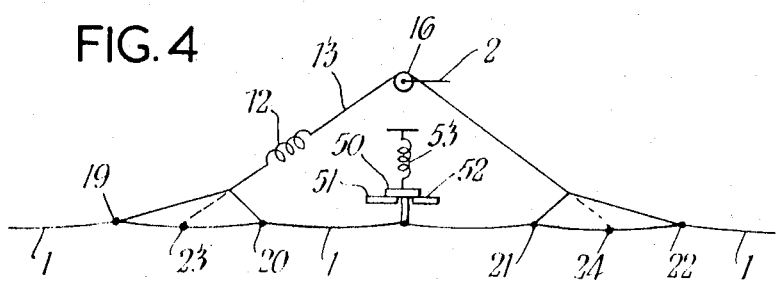
Figure 5:
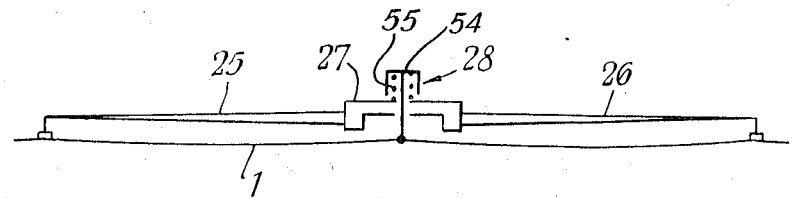
Figure 6:
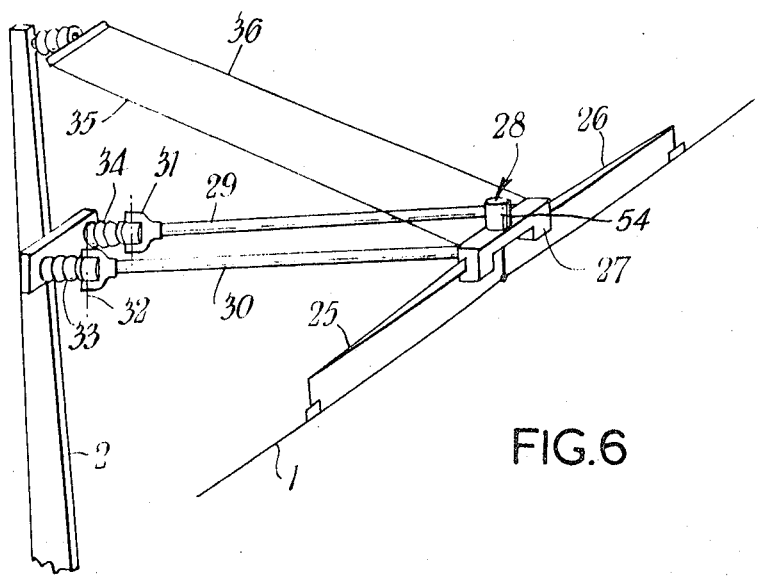
Figure 7:
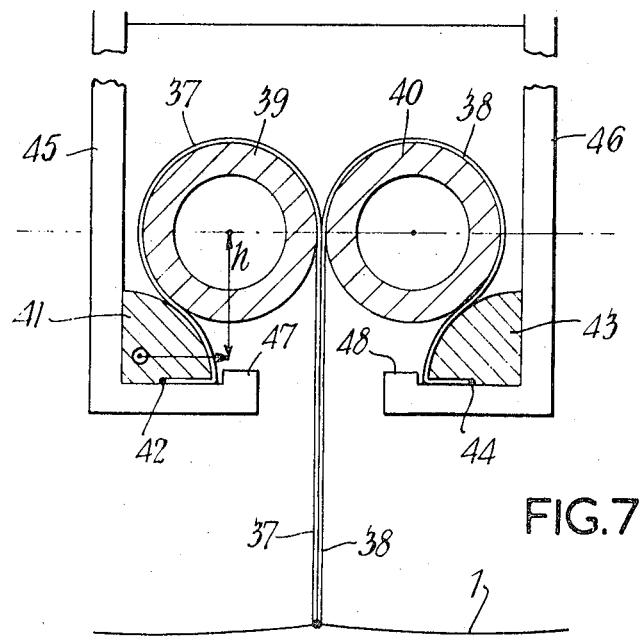
Figure 8:
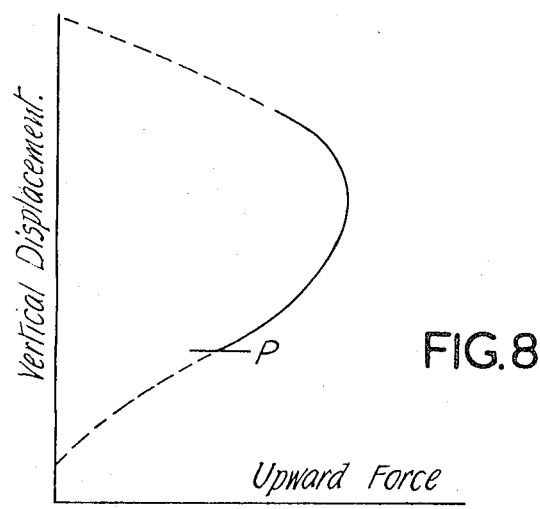

In order that the invention may be readily understood, embodiments thereof in accordance with the invention will now be described by way of example with reference to the accompanying diagrammatic drawings in which:

FIG. 1 shows a first embodiment using an auxiliary wire for suspending the elastic support members, FIGS. 2 and 3 show second and third embodiments respectively in which the elastic support members are embodied in a simple stitch suspension, FIG. 4 shows a fourth embodiment in which the elastic support members are embodied in a compound stitch suspension, FIG. 5 shows a fifth embodiment in which the elastic support members comprise a flexible spreader bar arrangement, FIG. 6 shows how the spreader bar arrangement of FIG. 5 is connected to a mast, FIG. 7 shows a negative rate spring construction by which the contact wire is supported and located at a mast, and FIG. 8 shows the operating characteristic of the negative rate spring of FIG. 7.

Referring to FIG. 1, a span of the contact wire 1 extends between masts 2 and 3 and is positively located and supported under tension at points 4 and 5 on the masts so that it droops into a shallow catenary. Such support and location at the masts 2 and 3 may be through two rate spring arrangements as described hereinafter. Also extending between the masts 2 and 3 is an auxiliary wire 6, and suspended from the auxiliary wire 6 are a series of relatively soft springs 7 which at their lower ends are attached to the contact wire 1 and provide a weight compensating lifting force on the wire. Since the springs 7 are soft, they will provide no substantial resistance to upward displacement of the contact wire 1 by the pantograph head 9 as it passes along the contact wire. Hence the desired relationship with the upward force exerted by the pantograph head 9 is unaffected.

Each attachment of a spring 7 to the contact wire 1 will form a minor cusp 10; these cusps have been shown exaggerated in FIG. 1. By giving each of the springs 7 a small amount of stiffness the deleterious effect of these cusps 10 can be counteracted, in that as the pantograph head 9 displaces the contact wire 1 upwards, the stiffness of the relatively soft springs 7 will cause a flattening of the cusps.

Although the springs 7 are shown equally spaced from each other along the contact wire 1 it is not necessary that they should be, the only essential requirement being that the total upward force provided by the springs 7 in a span of the contact wire 1 between the masts 2 and 3 approximately satisfies the condition stated above, namely that:

$$S = W - 2P$$

Instead of having a series of springs suspended from an auxiliary wire as shown in FIG. 1, the weight compensating elastic members may be embodied in a so-called stitch suspension in the neighborhood of the masts at each end of a span of the contact wire 1. The arrangement then provided at each mast may be as shown in FIG. 2, where positive location and support of the contact wire 1 by the mast 2 is through a two rate spring arrangement represented by spring 11 and weight compensation is provided by spring 12 in stitch wire 13. The stitch wire 13 is attached to the points 14 and 15 in adjacent spans of the contact wire 1, the points 14 and 15 being for example 20 ft. apart. The stitch wire 13 extends over roller 16 attached to the mast 2. The amount of upward force provided by the stitch may with advantage be slightly less than the amount required to make the trajectory of the pantograph head straight. That is to say:

$S < (W = 2p)$ so that the slight changes in slope of the trajectory are shared between the end points 14 and 15 of the stitch and the support through spring 11.

As an alternative to the arrangement of FIG. 2, the roller 16 over which the stitch wire runs may be supported from the mast 2 by spring 18 as shown in FIG. 3.

As an alternative to the simple stitch suspensions of FIGS. 2 and 3, the contact wire may be supported in the neighborhood of each mast by a compound stitch suspension as shown in FIG. 4. The compound stitch provides four points of support 19 to 22. To ensure that the vertical components of force at points 19 to 22 are equal the lines of the stitch wire from roller 16 are such as to intersect the contact wire (as shown by the dotted lines) at points 23 and 24 midway between points 19 and 20 and midway between points 21 and 22 respectively.

As an alternative to the stitch wire 13 passing over a roller 16 in order to provide for expansion and contraction of the wire, it may be connected to a swing arm. In this case weight compensating springs 12 would have to be provided in each arm of the stitch.

A further alternative arrangement for providing weight compensation of the contact wire 1 by elastic support members is shown in FIGS. 5 and 6. In this arrangement the elastic support members are in the form of tapered spring rods 25 and 26 which at their narrow ends are attached to the contact wire and at their thicker ends are attached to a block 27 connected to the mast 2. The two rate spring arrangement through which the contact wire is supported and located on the mast 2 is represented at 28. The spring rods 25 and 26 may be made of lightweight material such as glass fiber so as to reduce their inertia. The spring rods in their unstressed condition, i.e., when not attached to the contact wire 1, curve upwardly.

The block 27 is supported from the mast 2 by two cantilever arms 29 and 30, swingable in a horizontal plane about pivotal axes 31 and 32 in insulators 33 and 34 to allow for expansion and contraction of the contact wire 1 under varying temperature conditions. Additional support of the block 27 is through ties 35 and 36. By the use of the two arms 29 and 30 the spring rod assembly is maintained substantially parallel to the track.

The support and location of the contact wire at the masts in the above-described embodiments may be through two rate springs, such that for upward pantograph forces on the contact wire below a predetermined value, a stiff restraint is provided and for upward forces on the contact wire above a predetermined value the spring provides a relatively soft restraint or even has a negative rate, that is to say it provides an upward force assisting the pantograph head to lift the contact wire.

In the embodiments of FIGS. 2 to 4 the stiff spring rate is derived from the resilience of the supporting mast itself and this could be so stiff that a relatively rigid location of the contact wire is provided. Thus, in the absence of the pantograph the effective weight ($W-S$) of the contact wire will cause stop 50 to be pulled down hard on to abutments 51 and 52, which are rigidly connected with a cantilever arm of the mast 2, against the upward lifting force provided by soft rate spring 53. It is arranged that the spring 53 provides an upward lifting force approximately equal to $P$ and hence, providing the upward force of the pantograph on the contact wire when it passes the mast does not exceed the aforesaid value $P$, the contact wire will act as though it is solidly connected to the mast and thus resilient restraint will be provided by the mast. When, however, the upward pantograph force exceeds the value $P$ the stop 50 will be lifted clear of the abutments 51 and 52. In FIGS. 5 and 6 the same two rate spring principle is applied where the stop is provided by cap member 54 the abutment by block 27 and the soft rate spring is represented at 55.

As previously stated, the second rate of the spring arrangement instead of being a soft positive rate, which will provide some small restraint to lifting of the contact wire when the latter is clear of the abutments, may be a negative rate. That is to say if the upward force exerted by the pantograph as it passes the mast exceeds the predetermined value $P$ the spring assists in lifting the contact wire rather than providing a soft restraint as shown in FIGS. 2 to 6. In FIG. 7 is shown one construction which will provide such a negative rate.

In FIG. 7 the contact wire 1 is supported at each support point by two stiff steel tapes 37 and 38 which extend upwardly between the nip of tubular steel rollers 39 and 40. The tapes then divide, the tape 37 passing around roller 39, between roller 39 and quadrant 41 and then following the quadrant to anchorage 42. Similarly the tape 38 after dividing from tape 37 passes around roller 40, between roller 40 and quadrant 43 and then follows quadrant 43 to anchorage 44. The quadrants 41 and 43 are secured to spring plates 45 and 46 which are bent round to define lower limit stops 47 and 48. At their upper ends the spring side plates 45 and 46 are secured to the mast. The spring action is achieved by the elasticity of the spring side plates which provide through the quadrants 41 and 43 an upward component of force on the spring rollers 39 and 40; the force being related to the value of '$h$.' In FIG. 8 the upward force provided by the spring is plotted against vertical displacement. The upward force provided by the spring over the range of upward displacement from the stops 47 and 48 has a characteristic as shown in full line in FIG. 8, the dotted continuation showing the full characteristic if the appropriate limit stops were not provided.

When the pantograph is remote from the mast, the conditions are such that the rollers 39 and 40 are hard down on the abutments 47 and 48 corresponding to the abutments 51 and 52 of FIGS. 2 to 4. As the pantograph approaches, providing that the upward force it exerts on the contact wire does not exceed its predetermined value P, the rollers 39 and 40 remain on the stops due to the effective weight of the wire and the resilience of the supporting mast provides a stiff restraint. If however the upward force exerted by the pantograph exceeds the predetermined value, the rollers leave the abutments and roll up the quadrants and the spring exerts a lift on the contact wire 1 to advantageously reduce the temporary increase in contact force between the pantograph head and the contact wire.

As will be appreciated it is not necessary for the rollers 39 and 40 to roll on circular arcs provided by the quadrants 41 and 43. The rollers could roll on other profiles to achieve a desired but different spring characteristic to that shown in FIG. 8.

We claim:

1. A trolley wire overhead electric supply system for supplying power for the propulsion of electric vehicles, comprising a plurality of supporting masts spaced from one another, a contact wire in tension spanning adjacent masts and directly supported and located by each of said masts for engagement by a contact member on a vehicle, and soft elastic support members supporting said contact wire at points remote from said masts, said members providing a lifting force on the contact wire partially compensating for the weight of the contact wire and satisfying the condition $S-W-P$, where $S$ is the upward lifting force provided in each span of said contact wire by said soft elastic support members, $W$ is the weight of the wire in each span, and $P$ is a predetermined upward force on the contact wire produced by the contact member on a vehicle.

2. An overhead electric supply system as claimed in claim 1, wherein the soft elastic members are suspended from an auxiliary wire slung between the masts.

3. An overhead electric supply system as claimed in claim 1, wherein the soft elastic members comprise spring rods which at one of their ends engage the contact wire and at their other end are connected to the adjacent mast.

4. An overhead electric supply system as claimed in claim 1, wherein the support and location of the contact wire at each mast comprises a spring arrangement such that for upward forces on the contact wire by the contact member below a predetermined value a stiff spring rate or relatively rigid location of the contact wire is provided, and for upward forces above said predetermined value a negative spring rate is provided, that is to say the spring arrangement assists the contact member in lifting the contact wire.

5. An overhead electric supply system as claimed in claim 4, wherein said negative spring rate is provided by a spring comprising a pair of opposed vertically extending spring members, a pair of rollers disposed between said spring members and urged into contact with each other at their peripheries by said spring members, said rollers being arranged to roll along respective surfaces on said spring members which surfaces define a downwardly decreasing gap between them, a pair of tape members attached to said contact wire and extending upwardly therefrom between the nip of said rollers and then each extending over a respective one of said rollers and then between the said roller and the associated one of said surfaces to an anchorage on the associated spring member, the arrangement being such that in the absence of the contact member the effective weight of the contact wire exerts a sufficient force on the rollers through said tapes to pull the rollers against stops at the lower ends of said surfaces, whereby when said contact member exerts an upward force above a predetermined value on said contact wire said rollers are caused to roll up said surfaces under the action of said spring members to provide a varying upward component of spring force on said contact wire which is initially an increasing force and then a decreasing force.

6. An overhead electric supply system as claimed in claim 5, wherein each of said surfaces defines a circular arc.

7. A trolley wire overhead electric supply system for supplying power for the propulsion of electric vehicles, comprising a plurality of supporting masts spaced from one another, a contact wire in tension spanning adjacent masts and being directly supported and located by each of said masts, and soft elastic support members supporting said contact wire at points remote from said masts and providing a lifting force on the contact wire partially compensating for the weight of the contact wire, said soft elastic members being embodied in stitch suspensions, each comprising a stitch wire which at its ends is attached to the contact wire in adjacent spans thereof and in its extension between the points of attachment to the contact wire passes over supporting means disposed on the mast at the junction of said two adjacent spans.

8. An overhead electric supply system as claimed in claim 7, wherein said stitch suspensions comprise a compound stitch having at each end a plurality of attachment points to the contact wire.

9. An overhead electric supply system as claimed in claim 7, wherein each said soft elastic member comprises spring means in the length of the stitch wire.

10. An overhead electric supply system as claimed in claim 7, wherein each said soft elastic member comprises spring means through which the supporting means for the stitch wire is connected to the associated mast.

* * * * *